United States Patent [19]

Zayatz

[11] Patent Number: 4,601,962
[45] Date of Patent: Jul. 22, 1986

[54] ANODE ASSEMBLY FOR LITHIUM-HALOGEN CELL

[75] Inventor: Robert A. Zayatz, North Tonawanda, N.Y.

[73] Assignee: Wilson Greatbatch Ltd., Clarence, N.Y.

[21] Appl. No.: 541,437

[22] Filed: Oct. 13, 1983

Related U.S. Application Data

[62] Division of Ser. No. 368,865, Apr. 15, 1982, Pat. No. 4,421,833, which is a division of Ser. No. 222,498, Jan. 5, 1981, abandoned.

[51] Int. Cl.$^4$ ............................................. H01M 4/02
[52] U.S. Cl. .................................... 429/211; 429/101; 429/218
[58] Field of Search ............... 429/101, 209, 211, 181, 429/246, 178

[56] References Cited

U.S. PATENT DOCUMENTS

| | | | |
|---|---|---|---|
| 3,817,791 | 6/1974 | Greatbatch et al. | 429/101 |
| 4,147,842 | 4/1979 | Holmes et al. | 429/101 |
| 4,166,158 | 8/1979 | Mead et al. | 429/181 |
| 4,184,007 | 1/1980 | Urry | 429/101 X |
| 4,210,708 | 7/1980 | Mead et al. | 429/181 |
| 4,212,930 | 7/1980 | Athearn | 429/101 |
| 4,288,507 | 9/1981 | Carr et al. | 429/246 X |
| 4,401,736 | 8/1983 | Zayatz | 429/211 |

Primary Examiner—Charles F. Lefevour
Attorney, Agent, or Firm—Christel, Bean & Linihan

[57] ABSTRACT

An anode assembly for a lithium-halogen cell including halogen-containing cathode material, i.e. depolarizer, such as an iodine-organic complex wherein the anode comprises an electrical conductor sandwiched between a pair of lithium plates defining substantially oppositely directed lithium surfaces terminating in a peripheral lithium edge and characterized by a major portion of the length of the peripheral edge being exposed to the cathode material. This greatly increases the available internal volume of the cell for cathode material which, in turn, increases the theoretical ampere-hour rating of the cell. At least one and preferably both oppositely directed lithium surfaces have formations such as ribs or the equivalent which increases the surface area thereof, and the formations terminate a short distance from the edge to form a marginal type, peripheral border and highly effective seal therearound. The inner surfaces of the lithium plates can include co-operating formations near the peripheral edge shaped to expose new surfaces of the lithium plates to each other to form or enhance the bond therebetween. The anode assembly is formed using mold sections of a polyolefin material such as a high density polyethylene or equivalent material and having tapered recesses to provide effective separation of the anode from the mold without any need for parting sheets.

7 Claims, 11 Drawing Figures

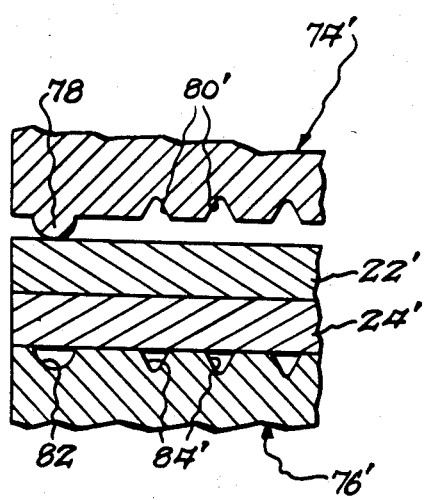
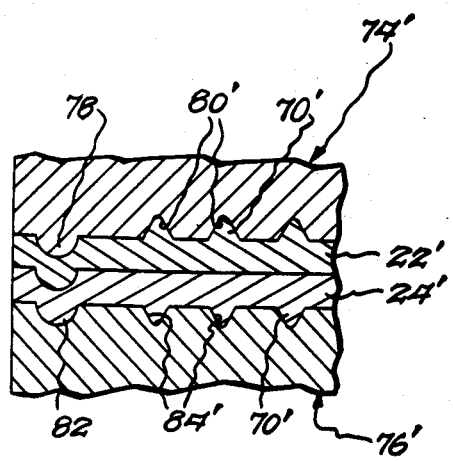
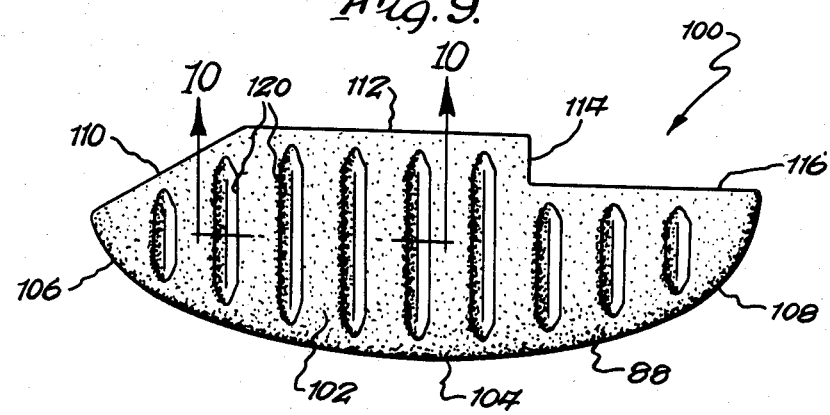
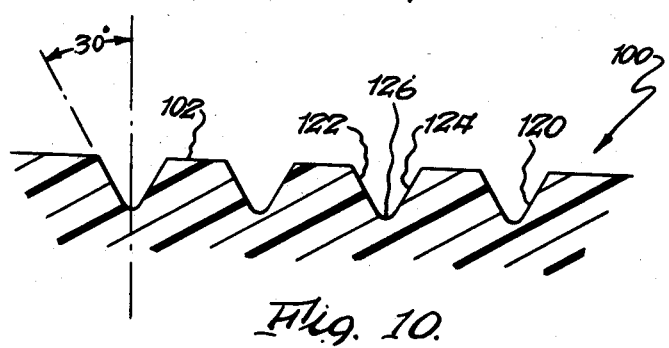

4,601,962

ANODE ASSEMBLY FOR LITHIUM-HALOGEN CELL

This is a divisional of application Ser. No. 368,865, filed Apr. 15, 1982, now U.S. Pat. No. 4,421,833 as a division of Ser. No. 222,498, filed Jan. 5, 1981, and now abandoned.

BACKGROUND OF THE INVENTION

This invention relates to the conversion of chemical energy to electrical energy, and more particularly to a new and improved anode construction for lithium-halogen cells and method of making the same.

One area of use of the present invention is in providing electrical power to inaccessible devices in the human environment, for example to an implanted cardiac pacemaker, although the principles of the present invention can be variously applied. Lithium-iodine batteries are available for such use and advantageously have an open circuit voltage of about twice that of the mercury cell, do not generate gas during operation, and have a non-corrosive electrolyte.

It is desirable to maximize that portion of the internal cell volume for containing cathode material which in turn increases the theoretical ampere-hour rating of the cell. It is also desirable to maximize the lithium anode surface area in direct operative contact with the cathode material. In addition, the nature of the iodine-containing cathode material such as an iodine complex is that it can tend to flow within the cell and possibly form a short circuit path between the anode collector lead and the cathode. Therefore it is important to prevent such leakage.

SUMMARY OF THE INVENTION

It is, therefore, an object of this invention to provide a new and improved anode for a lithium-halogen cell.

It is a further object of this invention to provide such an anode having an increased surface area for operative contact with the cathode material, i.e. depolarizer, in the cell.

It is a further object of this invention to provide such an anode having a structure which increases that portion of the internal cell volume for containing depolarizer material and thereby increasing the theoretical ampere-hour rating of the cell or, alternatively, permitting the entire outer dimensions of the cell to be reduced while maintaining the same theoretical ampere-hour rating.

It is a further object of this invention to provide such an anode with an enhanced seal of the anode conductor therein providing improved isolation from the iodine-containing cathode material in the cell casing.

It is a further object of this invention to provide a method of making such an anode of the type including an anode current collector sandwiched between a pair of lithium plates characterized by providing improved lithium-lithium cohesion.

It is a more particular object of this invention to provide such a method which accomplishes improved lithium-lithium cohesion using lower pressing forces.

It is a further object of this invention to provide such an anode that enables the cell to have fewer parts, to be easier to manufacture, and to be more reliable in operation.

It is a further object of this invention to provide such an anode assembly wherein the lithium area therein is relatively large and the overall size is relatively small.

It is a further object of this invention to provide a new and improved apparatus for making an anode for a lithium halogen cell including a mold which readily separates from the lithium anode after forming.

The present invention provides an anode assembly and method of making same for a lithium halogen cell including halogen-containing cathode material, the anode assembly comprising an anode electrical conductor sandwiched between a pair of lithium plates defining substantially oppositely-directed lithium surfaces terminating in a peripheral lithium edge and characterized by a major portion of the length of the peripheral edge being uncovered and exposed. Additionally, areas of the oppositely-directed lithium surfaces adjacent to the major portion of the peripheral edge also are uncovered and exposed. At least one and preferably both of the oppositely-directed lithium surfaces are shaped to include formations which increase the surface area thereof, and the formations terminate a short distance inwardly of the peripheral edge thereby defining a marginal border region between the peripheral edge and the formations. The inner mating surfaces of the lithium plates under the marginal border region experience increased pressing movement during formation of the anode with lower pressing force resulting in a greatly increased lithium-lithium bond therebetween. Alternatively, the inner surfaces of the lithium plates can be formed to include co-operating formations that are shaped to expose new surfaces of the lithium plates to each other which in mating enhance the bond therebetween. The anode assembly is formed by an apparatus including a pair of mold type sections or plugs of polyolefin material, such as polyethylene, having sufficient density and provided with surface formations shaped to provide a mechanical release thereby providing effective separation of the lithium anode from the plugs after the forming operation. The apparatus further includes a segmented nest or ring type device for imparting shape to the formed anode, and portions of the nest which contact the lithium anode also are of polyolefin material, for example high density polyethylene, or the equivalent. During use the apparatus surrounds the assembly at the periphery of the lithium elements and allows release of the lithium anode after the forming operation without requiring the use of parting sheets.

The foregoing and additional advantages and characterizing features of the present invention will become clearly apparent upon a reading of the ensuring detailed description together with the included drawing wherein:

BRIEF DESCRIPTION OF THE DRAWING FIGURES

FIG. 7 is a fragmentary elevational view illustrating one stage of a method according to an alternative embodiment of the present invention shown prior to pressing;

FIG. 8 is a fragmentary elevational view illustrating another stage of the method of FIG. 7 shown after pressing;

FIG. 9 is an elevational view of a portion of the apparatus for fabricating the anode assembly according to the present invention;

FIG. 10 is an enlarged fragmentary sectional view taken about on line 10—10 in FIG. 9.

DETAILED DESCRIPTION OF THE ILLUSTRATED EMBODIMENTS

Figure 1:
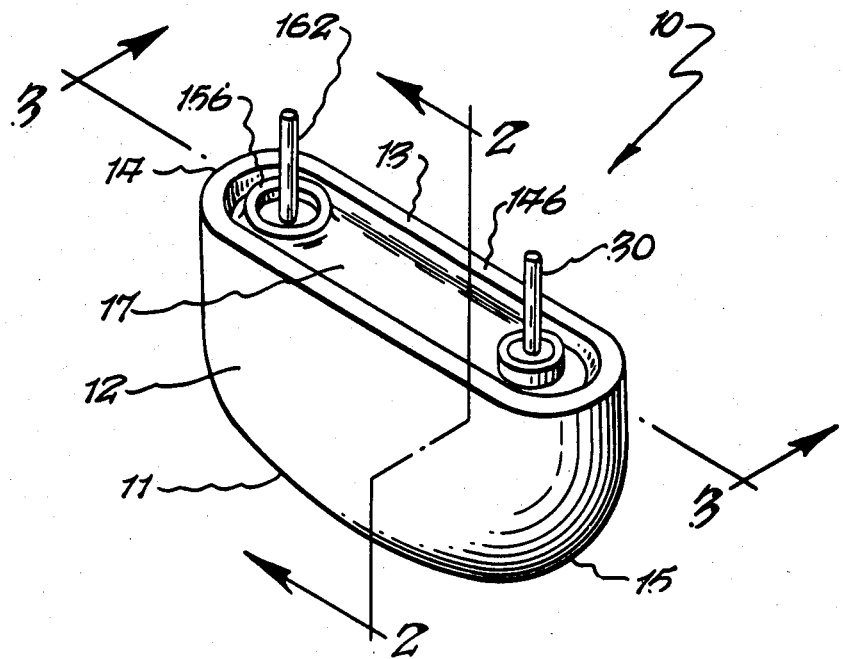
FIG. 1 is a perspective view of a lithium-iodine cell including an anode assembly according to the present invention.

Referring now to FIG. 1, a lithium-iodine cell having an anode according to the present invention comprises a casing 10 of metal such as stainless steel which preferably is shaped or otherwise formed to be hollow and generally rectangular in shape of an integral construction including a bottom portion 11, spaced-apart planar side wall portions 12,13 extending from the bottom portion, and spaced-apart curved end wall portions 14,15 also extending from bottom portion 11 and joining corresponding ones of the side wall portions 12, 13. The bottom portion 11 is of compound shape in that it is curved in a direction between the side wall portions 12, 13 and has a straight section between the end wall portions 14, 15. The curvature of bottom portion 11 between side portions 12, 13 is of the same degree as the curvature of the end wall portions 14, 15 thereby defining a continuous, curved surface around the casing. The side wall portions 12, 13 are generally parallel. Casing 10 has an opened top or end opposite the bottom portion 11 which is sealed closed by means of a lid 17 also of metal such as stainless steel after the cell has been assembled as will be described in detail presently.

Figure 2:
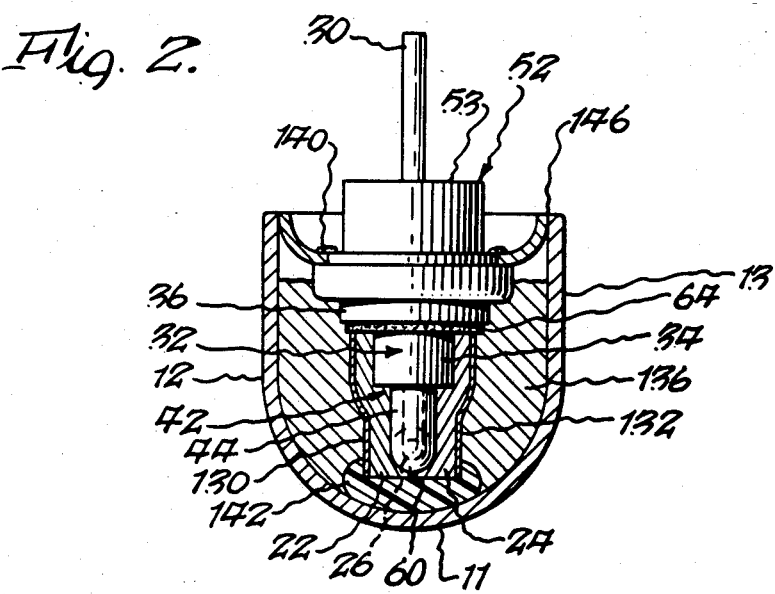
FIG. 2 is a sectional view taken about on line 2—2 in FIG. 1.
Figure 3:
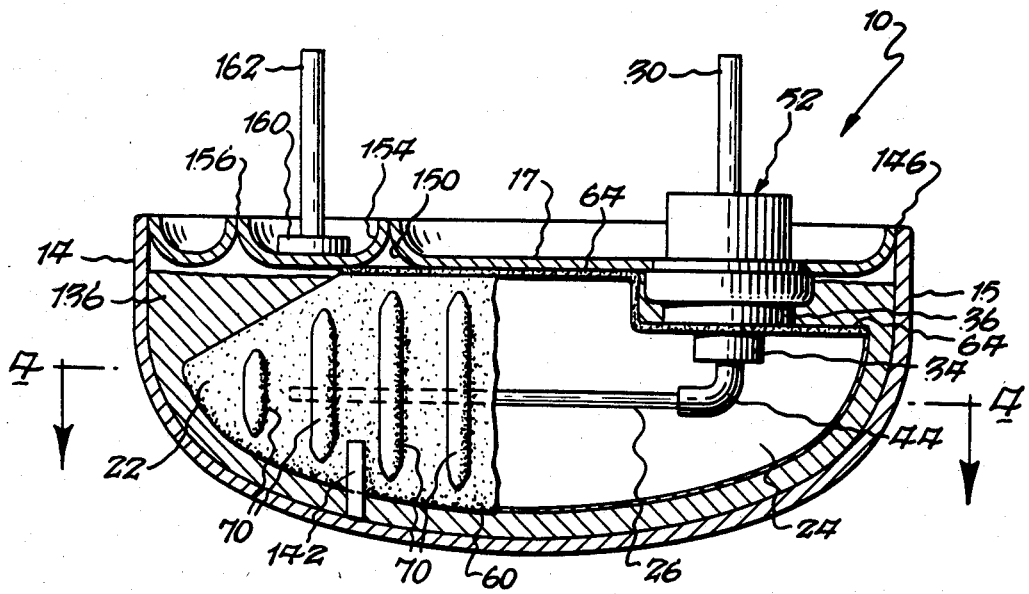
FIG. 3 is a sectional view taken about on line 3—3 in FIG. 1.

Referring now to FIGS. 2 and 3, the anode of the present invention comprises a pair of lithium elements or plates 22,24 having an anode electrical conductor 26 sandwiched or positioned therebetween. In the anode assembly shown, conductor 26 is one portion or length extending from another portion or length 30 of the anode conductor which portion 30 extends from portion 26 at about a right angle and is of sufficient length allowing it to extend out from casing 10 for making electrical connection thereto. The anode electrical conductor comprising portions 26,30 is of nickel, nickel-iron alloy or other suitable metal. Various alternative arrangements can be employed, such as portion 26 being in the form of one or more strands or ribbons, or having a larger screen attached thereto, or a plurality thereof and such as portions 26 and 30 having a common longitudinal axis substantially perpendicular to the plane of lid 17 so that a straight anode conductor is provided. In the cell shown the conductor portion 26 is relatively narrow in width and contacts only minor portions of the surface areas of the inner surfaces of the lithium plates 22,24. The narrow conductor portion 26 functions well and may not be large in area unless so desired since lithium is a conductive metal.

The portion or length 30 of the anode conductor is sealed from the remainder of the cell by means including an insulator element generally designated 32 which surrounds conductor portion 30 and which insulator has a first body portion 34 which is sandwiched between the plates 22,24 and a second body portion 36 which is of larger cross section, preferably cylindrical, and located between the lithium plates and lid 17 when the cell is completed. The longitudinal axis of insulator 32 is generally coincident with the longitudinal axis of lead portion 30. The insulator 32 is of a material which in addition to being a non-conductor of electricity also is non-reactive with iodine, i.e. does not exhibit electronic condition when exposed to halogens such as iodine. One form of material found to perform satisfactorily is a fluoropolymer material commercially available under the name Halar, a trademark of the Allied Chemical Company. Other materials such as Tefzel, a trademark of the Dupont Company, or others having these characteristics can of course be used for the insulator 32.

The anode conductor sealing means further comprises an isolator element generally designated 42 located between insulator 32 and conductor 30. In particular, isolator 42 includes a first portion 44 having an outer dimension enabling it to fit relatively snugly within insulator portion 34 and a second portion of a size and shape enabling it to be received within insulator portion 36. Isolator 42 has a longitudinal passage or bore along the entire length of isolator 42 and of a cross-sectional dimension enabling it to receive anode conductor portion 30. The isolator element 42 is of a material which does not exhibit electronic conduction when exposed to halogens such as iodine. One form of material found to perform satisfactorily is the previously mentioned fluropolymer material commercially available under the name Tefzel.

The anode conductor sealing means further comprises a ferrule 52 of metal such as stainless steel which encloses a further portion of lead 30. Ferrule 52 is of generally hollow cylindrical shape with substantially constant outer diameter proceeding from one end 53 toward casing 10 as viewed in FIG. 2, and ferrule 52 has a slightly larger outer diameter which increases stepwise in the region adjacent lid 17. The end of ferrule 52 opposite end 53 has portions which contact end portions of insulator 32 and isolator 42. The longitudinal axis of ferrule 52 is generally coincident with the longitudinal axis of conductor 30. The inner diameter of ferrule 52 is substantially constant proceeding from the one end and continuing along within the larger diameter portion. The anode conductor portion 30 extends through ferrule 52 along the longitudinal axis thereof and spaced substantially equidistant from the inner surface of ferrule 52. A cylindrical seal element (not shown) of glass having an axial bore to receive conductor portion 30 is fitted within ferrule 52. The seal element preferably extends from the ferrule end face 53 along a major portion of the length of ferrule and has an inner end portion which may contact an end portion of isolator 42.

The internal structure and arrangement of insulator 32, isolator 42 and ferrule 52 can be as shown and described in U.S. Pat. No. 4,166,158 issued Aug. 28. 1979 or in U.S. Pat. No. 4,210,708 issued July 1, 1980 both assigned to the assignee of this invention, and the disclosures of both patents are hereby incorporated by reference.

As shown in FIGS. 2 and 3, the anode assembly of the present invention comprises the anode electrical conductor 26,30 sandwiched between the pair of lithium plates 22,24 defining substantially oppositely-directed lithium outer surfaces which terminate in a marginal or peripheral edge 60. The anode assembly of the present invention is characterized by a major portion of the length of the peripheral edge 60 being uncovered and exposed to cathode material in the cell. In the anode assembly shown, for example in FIG. 3, the uncovered and exposed portion of the length of the peripheral edge 60 includes the relatively straight bottom portion which faces the casing bottom 11, upwardly curved portions at each end of the bottom portion, and an inclined or angled portion at the lefthand end as viewed in FIG. 3. The areas of the oppositely-directed lithium surfaces adjacent to the aforementioned major portion of peripheral edge 60 also are uncovered and exposed to cathode material in the cell. In the anode assembly of the present invention a minor portion of the length of the peripheral edge can be covered by an element 64 of electrically insulating material if so required. Element 64 is in the form of a band or strap which is relatively thin and may have a width larger than the width of the anode. In the anode assembly shown, for example in FIG. 3, element 64 extends along a flat top portion of the length of the peripheral edge which faces lid 17 and is generally parallel to the lid and further extends along a right angle step portion against which insulator portion 36 rests. In the cell shown, the section of element 64 along the flat top portion of the anode peripheral edge contacts the inner surface of lid 17 but alternatively could be spaced a short distance therefrom. In addition, the insulating element 64 may be eliminated if the anode lithium elements 22,24 are spaced from lid 17 a distance sufficient to avoid any electrical short circuit conditions. As a result, cathode material in the cell not only contacts the oppositely directed surface portions of the lithium elements 22,24 but also contacts a major portion of the peripheral edge 60 as well as areas of the oppositely directed surfaces immediately adjacent the major portion of the peripheral edge. As a result the anode has an increased surface area which operatively contacts cathode material or depolarizer in the cell. The foregoing anode structure, characterized by a major portion of the length of peripheral edge 60 and the adjacent areas of the oppositely directed surfaces being uncovered and exposed, results n an increased cell internal volume for containing depolarizer material. This, in turn, increases the theoretical ampere-hour rating of the cell. Alternatively, the foregoing anode structure permits the outer size of the cell to be reduced while maintaining the same theoretical ampere-hour rating of the cell.

In the anode assembly according to the present invention at least one and preferably both of the oppositely-directed lithium surfaces of plates 22,24 is shaped to include formations which increase the surface area thereof. Referring to FIG. 3 the formations are designated 70 and each formation is elongated having terminations at both ends thereof. The terminations are spaced inwardly a short distance from the peripheral edge of the anode assembly thereby defining a marginal border region between the peripheral edge and the termination of the formations. The formations 70 are generally mutually parallel, and are also generally parallel to the common longitudinal axes of ferrule 52 and the section of lead 30 therein. The formations 70, which are in the shape of ribs or corrugations, have generally smooth outer surfaces and preferably are generally semi-circular in cross-section. In the anode structure shown, the sections between adjacent ribs 70 have oppositely-directed smooth surfaces. The ribs occupy a major portion of the outer surface area of each lithium element 22,24. The remaining surface portions are generally planar and mutually generally parallel except around insulator portion 34 and isolator portion 44 where they are curved or outwardly bulged.

One illustrative method of forming the anode assembly is as follows. First there is provided a subassembly including the combination of insulator 32, isolator 42, ferrule 52 and conductor portions 26,30 with conductor portion 30 being within the combination of insulator 32, isolator 42, and ferrule 52. Briefly, isolator 42 is assembled into ferrule 52, and then the combination of isolator 42 and ferrule 52 is joined to insulator 32. For a more detailed description of the foregoing, reference may be made to the afore-mentioned U.S. Pat. Nos. 4,166,158 or 4,210,708. The insulator strip 64 then is assembled into place, the strip having an opening therein enabling it to be fitted onto insulator portion 34 as shown in FIG. 3. It can be joined to insulator parts 34,36 by means of a suitable cement which is non-reactive with iodine such as a cyanoacrylate cement commercially available from the Pearl Chemical Co. under the name Permabond 101. During an earlier stage of the method, the end of isolator portion 44 and section of conductor 26 contained therein were bent or otherwise curved as a unit by a suitable tool to the left as viewed in FIG. 3 to form substantially a right angle with the portion 30 and longitudinal axis of ferrule 52. The lithium plates 22,24 then are positioned on opposite sides of the conductor 26 and insulator portion 34. As shown in FIG. 3, the step or rectangular shoulder on the peripheral edge of the lithium plate combination abuts against the lower surface of insulator portion 36, the insulator strip being therebetween. Strip 64 extends along the top portion as viewed in FIG. 3 including the right angle step adjacent to insulator portion 36. The subassembly then is placed within two mold sections and is pressed together with a suitable force, for example about 2,000 pounds. The conductor 26, insulator portion 34 and the section of lead 30 contained therein are sealed within the lithium elements 22,24. The inner surfaces of the two mold sections are shaped to define the rippled or corrugated outer anode surface formations shown in FIGS. 3 and 4. Removal of the anode from the mold can be facilitated by employing two parting sheets, preferably of polyethylene, one between each of the mold sections and the corresponding outer surface of the anode. However, according to another aspect of this invention which will be described in detail presently, no parting sheets are necessary because the molds and a portion of the anode pressing apparatus are made of a polyolefin material, such as high-density polyethylene or equivalent material, which has been found not to adhere readily to the lithium but rather to allow the lithium to be removed from the molds and the pressing apparatus after the pressing operation and without the use of parting sheets.

Figure 4:
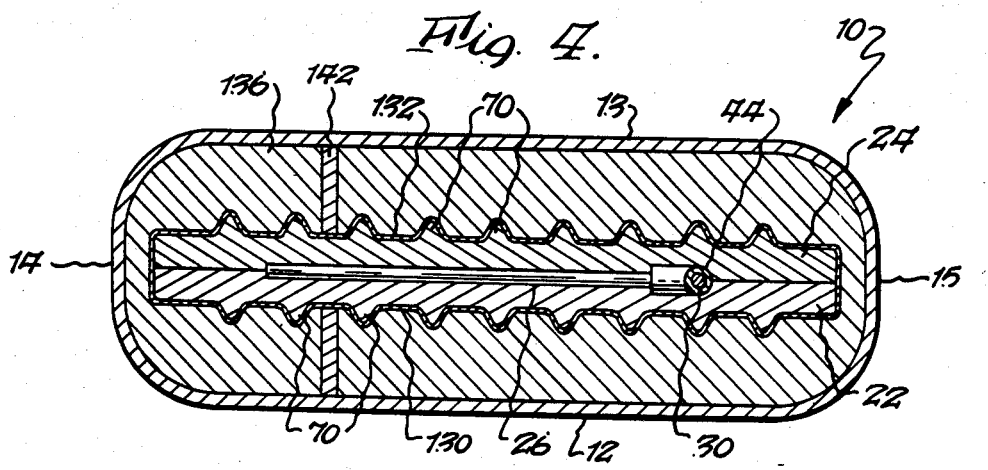
FIG. 4 is a sectional view taken about on line 4—4 in FIG. 3.

As shown in FIG. 4, the oppositely directed lithium anode surfaces are formed to have the spaced, generally mutually parallel ribs or corrugations 70 which extend parallel to the common longitudinal axes of ferrule 52 and the section of lead 30 therein. The formations or ribs 70 have generally smooth outer surfaces which preferably are generally semi-circular in cross-section. In the anode structure shown, the section between adjacent ribs have oppositely directed smooth surfaces, and the common thickness of the sections is about one-half the overall thickness measured from the outer tip of one corrugation to the outer tip of the aligned corrugation on the opposite face of the anode structure, although this can vary. The ribs 70 occupy a major portion of the surface area of each lithium element 22,24. The remaining surface portions are generally planar and mutually generally parallel except around insulator portion 34 and isolator portion 44 where they are curved or outwardly bulged, and may completely pocket the insulator 34 and the isolator 44. This formation to enclose the insulator and isolator portions also is defined by the mold sections. The material of strip 64 may be bonded to the lithium elements 22,24 by applying the aforementioned Permabond or equivalent cement to strip 64 after the anode pressing operation to enhance its adhesion. The strip 64 may likewise be bonded to the lithium elements 22,24 if so desired before the anode is pressed. The finished anode assembly thus has two exposed surfaces which are oppositely directed.

Figure 5:
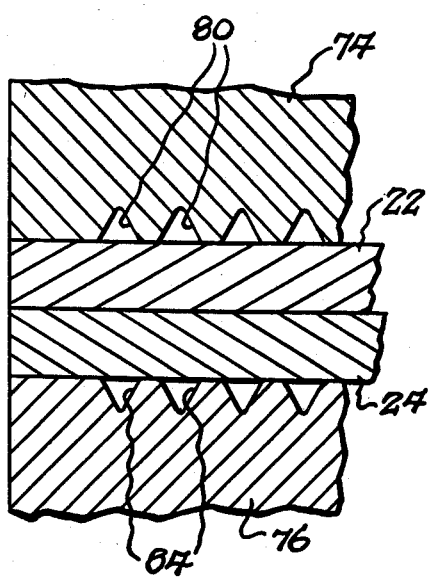
FIG. 5 is a fragmentary elevational view illustrating one stage of a method of forming the anode assembly according to the present invention.
Figure 6:
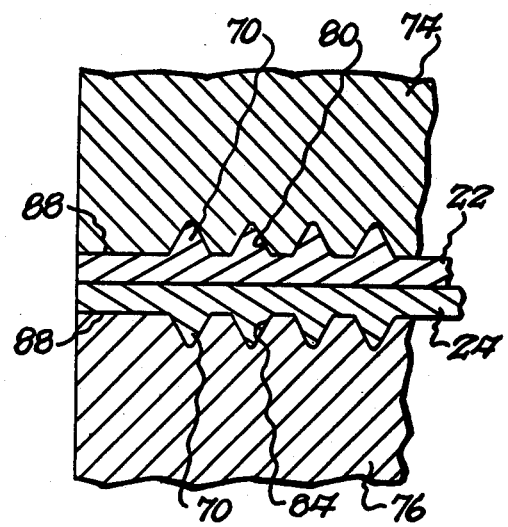
FIG. 6 is a fragmentary elevational view illustrating another stage of the method of FIG. 5.

FIGS. 5 and 6 illustrate in further detail the method of forming the anode assembly according to the present invention. A subassembly is provided in the manner described hereinabove and is placed along with the lithium plates 22,24 within two mold sections as previously described. Fragmentary peripheral portions of the two mold sections are designated 74 and 76 in FIGS. 5 and 6 which also show fragmentary peripheral portions of the lithium plates 22,24 of the subassembly between the mold sections. The inner surfaces of mold sections 74 and 76 are provided with spaced recesses 80 and 84, respectively, for providing the anode ribs. FIG. 5 shows the arrangement before pressing and FIG. 6 shows the arrangement after the mold sections 74,76 have been brought together and pressed against the subassembly and after the application of suitable force, for example about 2,000 pounds. The lithium plates 22,24 are bonded together, and the recesses 80,84 in the mold sections define the ribs or corrugations 70 in both opposite faces of the anode assembly.

The foregoing method results in greatly improved lithium-to-lithium cohesion in the resulting anode assembly after pressing. This is believed to be created by an unimpeded and uninterrupted flow or movement of the lithium upon itself or between both lithium plate surfaces and by the continuous marginal or peripheral border 88 of the anode assembly according to the present invention. In other words, there is no marginal, peripheral strap or frame around the greatest portion of the anode assembly of the present invention to restrict such flow. The strap, or in this case element 64, i.e. the separator, can be completely eliminated by spacing the lithium plates 22 and 24 a sufficient distance below the lid 17 so that no electrical shorting will ensue. The ribs 70 terminate inwardly of the periphery of the lithium plates to define the border 88 completely around the anode and on both opposite faces thereof. In addition, in the method of the present invention, significantly less pressure is required to form and bond the lithium and yet the lithium cohesion is markedly increased.

FIGS. 7 and 8 illustrate an alternative method of forming an anode assembly according to the present invention. A subassembly is provided in the same manner as in the foregoing method and is placed along with the lithium plates 22', 24' within two mold sections. Fragmentary peripheral portions of the two mold sections are designated 74', 76' in FIGS. 7 and 8 which also show fragmentary peripheral portions of the lithium plates 22',24' positioned between the mold sections. The upper mold section 74' as viewed in FIGS. 7 and 8 is provided with a protuberance or extension 78 on the inner or working face of the mold adjacent the peripheral edge. Protuberance 78 preferably is continuous, extending around the entire periphery of mold section 74' and in the arrangement illustrated in FIGS. 7 and 8 has a substantially semi-circular or curved outer surface so as to be bead-like. Alternatively, protuberance 78 could be of rectangular shape for ease in machining. Spaced within protuberance 78 the inner surface of mold section 74' is formed with spaced recesses, two of which are designated 80', for providing the anode ribs 70'. The lower mold section 76' as viewed in FIGS. 7 and 8 is provided with a recess 82 on the inner or working face of the mold adjacent the peripheral edge. Recess 82 preferably is continuous, extending around the entire periphery of mold section 76' and in the arrangement illustrated in FIGS. 7 and 8 has a substantially semi-circular or curved inner surface so as to mate with protuberance 78. Alternatively, recess 82 could be of rectangular shape for ease in machining. In addition, recess 82 is located on the face of mold section 76' so as to be in registry with protuberance 78 when the mold sections 74',76' are brought together. Spaced within recess 82 the inner surface of mold section 76' is formed with spaced recesses, two of which are designated 84', for providing anode ribs 70'.

FIG. 8 shows the arrangement after the mold sections 74',76' have been brought together and pressed against the subassembly and after the application of suitable force, for example about 2,000 pounds. The recesses 80' and 84' in the upper and lower mold sections 74' and 76', respectively, define the ribs or corrugations 70' in both opposite faces of the anode assembly as previously described. At the same time, protuberance 78 and recess 82 co-operate to shape or form the adjacent inner surfaces of lithium plates 22',24' to have co-operating formations which expose new surfaces of the lithium plates to each other to form or enhance the bond therebetween. These co-operating formations defined by protuberance 78 and recess 82 are located near the peripheral edges of the lithium plates 22',24'. In effect, the foregoing provides a flowing or moving border around the anode assembly, exposing new lithium surfaces to each other to crimp or seal the lithium plates 22',24' together for better cohesion. The resulting anode assembly is removed from the mold in a manner similar to the foregoing method.

FIGS. 9 and 10 illustrate a mold for forming the anode assembly according to the present invention. The mold comprises two complimentary sections or plugs, of opposite hand configuration, one of which is designated 100, which during use are confined in a suitable nest apparatus for pressing the lithium plates therebetween to shape and form the anode assembly. The mold plugs and portions of the nest apparatus are of a material and have a structure whereby the need for parting sheets is eliminated. In accordance with the present invention, the mold plugs and portions of the next are of polyolefin material, for example high density polyethylene or the equivalent, which provides easy separation of the mold and nest sections from the lithium plates after pressing. By way of example, such material can be Resinol type "F", a high density polyethylene commercially available from Allied Resinous Products, Inc. In addition, the face of each mold section or plug is formed with recesses to define the ribs or projections on the anode faces, and these recesses on the mold sections are shaped to enhance the mechanical release of the lithium plates from the mold sections after pressing.

Referring now to FIG. 9, mold section 100 includes a working face 102 which is flat and smooth and has a peripheral shape or configuration corresponding approximately to that of the anode plates 22,24. In particular, mold section 100 has an arcuate edge portion 104 corresponding to the edge of the anode assembly which faces the cell casing bottom 11 and which meets two outward curved edge portions 106,108 extending from the opposite ends of portion 104, an inclined or angled edge portion 110 at the left-hand end as viewed in FIG. 9, a straight edge portion 112 extending therefrom and two surfaces 114,116 defining a step at the right-hand end in FIG. 9. The shape or configuration of the mold sections can vary depending upon the desired anode shape or configuration, for example the portions 104 could be relatively straight rather than curved The working face 102 of mold section 100 is provided with a plurality of spaced, generally mutually parallel recesses 120 which are shaped to define the anode ribs or corrugations 70 shown in FIGS. 3 and 4. As shown in FIG. 10 each recess has a pair of side walls 122,124 which meet an inner or bottom wall 126. The bottom wall 126 is curved or arcuate, and the side walls 122,124 are relatively straight and inclined, or tapered outwardly. According to a preferred mode of the present invention, each of the walls 122,124 is disposed so as to define an angle of about 30 degrees to a plane normal to surface 102. Expressed differently, the plane of each wall 122,124 extended outwardly beyond surface 102 defines an included angle of approximately 60 degrees with surface 102.

An anode subassembly is provided in the same manner as the foregoing method and is placed in the nest along with the lithium plates 22,24 and between two mold sections or plugs, each section or plug being like section 100. No parting sheets are employed in the nest or between the mold sections and lithium plates. The mold sections are brought together against the lithium plates and a force of about 2000 lbs. is applied for a time of about seven seconds. Upon conclusion of the pressing operation, the mold sections are moved away from the pressed anode assembly. Separation is very good from each mold section, with the associated lithium surface separating freely and with no sticking or galling. The mold according to the present invention combines the releasing effects of the high density polyethylene material with the mechanical release provided by the tapered side walls of the recesses. While the afore-mentioned high density polyethylene material is preferred, an ultra high molecular weight polyolefn material can be employed, for example that commercially available from the Polymer Corp. under the designation Polypenco.

Figure 11:
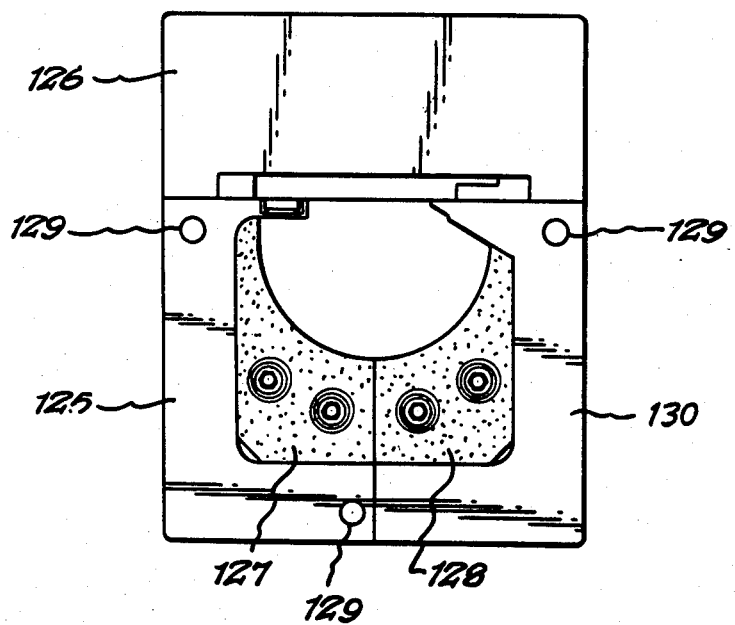
FIG. 11 is an elevational view of another portion of the apparatus for fabricating the anode assembly according to the present invention.

FIG. 11 illustrates the afore-mentioned nest apparatus which is in the form of a segmented nest or ring type device comprising three metal halves or sections 125,126,130 and a pair of inserts 127,128. In particular, sections 125,126,130 are joined by tongue and groove joints (not shown) extending from the abutting surface of one section into a mating recess in the abutting surface of the other section in co-operation with pin type fasteners 129. Inserts 127,128 are of the same polyolefin, for example high density polyethylene material, as the mold sections. The arcuate edge surfaces of the inserts 127,128 have a degree of curvature corresponding to the desired shape of the corresponding portions of the peripheral edge of the anode assembly. Section 130 has an angularly disposed inner edge surface corresponding to the angularly disposed portion of the anode peripheral surface, and the bottom of section 126 facing section 125 and 130 shaped to accomodate the lid of the assembly as previously described.

In use, one mold section is held in a suitable holding device or fixture (not shown), the anode subassembly and lithium plates are placed in the nest apparatus of FIG. 11 as previously described, and this is placed and held in the fixture so that the one mold section contacts one lithium surface in the desired manner. Then the other mold section is placed and held in the fixture in contact with the other lithium surface and pressure is applied thereafter. During the pressure forming operation, the nest apparatus simutaneously imparts shape to the periphery of the formed anode assembly. The inserts 127,128 which contact the lithium are of the aforementioned polyolefin material which readily releases from the lithium after the pressure forming operation without the need for any parting sheets.

After the anode assembly is removed from the nest, the exposed surfaces of lithium elements 22 and 24 are provided with coatings 130 and 132, respectively, or an organic electron donor component material, and the nature of the coatings 130,132 and their role in the cell of the present invention will be described in further detail presently. The completed anode assembly is positioned in casing 10 as shown in FIGS. 2 and 4, with the anode operative surfaces spaced from the inner surface of casing 10.

The cell of the present invention further comprises an iodine cathode including a region of cathode material 136 within casing 10 and operatively contacting the exposed surfaces of the lithium elements 22,24 and operatively contacting the inner surface of casing 10. Casing 10, being of electrically conducting material, serves as the cathode current collector. According to a preferred mode of the present invention, the cathode material 136 comprises a charge transfer complex of an organic electron donor component material and iodine. The electron donor can be any organic compound having a double bond or an amine group. The electron donor functions to give the iodine sufficient conductivity for proper cell operation. One preferred form of the organic electron donor component is polyvinyl pyridine polymer and, in particular, two-vinyl-pyridine polymer.

The cell of the present invention can be fabricated in the following manner. Ferrule 52 is welded to lid 17 at 140, and anode conductor portion 30 is secured in ferrule 52 by means of a glass seal (not shown). The assembly of isolator 42, two washers (not shown) and insulator 32 is combined with the ferrule-lid assembly, and then the approximate right angle bend in anode conductor portion 26 is made. The insulating element 64 is positioned in place, and if an anode current collector is to be used it is spot welded to the conductor portion 26. The foregoing assembly is positioned in the anode pressing fixture and lithium plates 22,24 are placed one on each side and the anode assembly combination is formed by means of one of the pressure forming methods previously described. The resulting combination then is placed in casing 10 with lead 30 disposed generally parallel to casing wall 12,13 and with the outer ends of ferrule 52 and lead 30 located outwardly of the open end of casing 10. At least one spacer element of material non-reactive with iodine can be located between the ribs 70 and adjacent the lower end of the anode assembly for contacting the inner casing wall to hold the anode in spaced relation to the casing. The material can be the aforementioned Halar material or the equivalent. A spacer 142 is shown, for example, in FIG. 2, but two spacers positioned at opposite ends of the anode could be employed. Lid 17 is welded to the periphery of casing 10 at 146. Casing 10 and the combination of parts therein is held upright with the open end facing upwardly by a holding fixture or other suitable means. Then cathode material is introduced to the casing 10 through the opening 150 in lid 17. In particular, the cathode material, i.e. depolarizer, is prepared by heating the organic material, i.e. 2-vinyl pyridine polymer, mixed with iodine, to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The resulting mixture is a viscous, flowable substance which can be introduced to cell casing 10 by flowing it through the opening 150. This may be done with the aid of a funnel-like filling element in a manner described in the afore-mentioned U.S. Pat. No. 4,210,708. Briefly, the heated cathode material is poured or otherwise introduced to the funnel-like filling element through which it flows into the interior of casing 10. The amount of cathode material 136 introduced to casing 10 is sufficient to contact the exposed surfaces of the lithium elements 22,24. The inner and adjacent surfaces of opening 150 contacted by surfaces of the filling element are kept clean and free of contamination by cathode material. When filling is completed, the filling element is removed from lid 17 and a closure element 154, preferably also of stainless steel, or the like, is fitted in place in opening 150 and then welded to lid 17 at 156 as shown in FIG. 3. An effective weld resutls from the clean inner surface and edge of opening 150. A terminal element including base 160 and pin 162 can be spot welded to closure 154 either before or after closure 154 is welded to lid 17.

The lithium-iodine cell according to the present invention operates in the following manner. As soon as the iodine-containing cathode material, for example the cathode material 136 in FIGS. 2–4, operatively contacts a lithium element, solid lithium-iodide electrolyte begins to form at the interface. In the present illustration this occurs at the outer or oppositely disposed surfaces of the two lithium elements 22 and 24. An electrical potential difference will exist between the anode lead 30 and cathode terminal pin 162 because casing 10 is of electrically conductive material and operatively contacts the iodine-containing material to serve as a cathode current collector. The mechanism by which the foregoing is accomplished is believed to include migration of lithium ions through the electrolyte whereby the lithium ion is the ionic species in the cell. The exact mechanism by which the iodine-containing cathode material 136 and lithium elements 22 and 24 come into operative contact through coatings 130 and 132, respectively, is not known. The mechanism could involve migration of iodide ions from material 136 through coatings 130,132 to elements 22,24 or migration of lithium ions from elements 22,24 through coatings 130,132 to material 136.

The material of coatings 130,132 on lithium elements 22 and 24, respectively, is an organic electron donor material of the group of organic compounds known as charge transfer complexes. The material of the coatings can be the organic electron donor material used in preparing the charge transfer complex of the cathode material 136, but other materials can be employed. A preferred material for the coatings is polyvinyl pyridine, and it is applied to the exposed surfaces of lithium elements 22 and 24 in a manner as described in the above-referenced U.S. Pat. No. 4,210,708.

The coatings 130 and 132 on lithium elements 22 and 24, respectively, perform several important functions. One is a desirable reduction in cell impedance believed to result from a better and improved electrically effective contact area between the cathode material and each lithium element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 130 and 132 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode element by the cathode material. In addition, the protective coatings 130,132 permit a relatively longer handling time during construction of the cell prior to introducing the hot cathode material.

It is important that the iodine-containing material 136 is not allowed to come in contact directly with any portion of the electrical conducting means connected to the lithium members of the anode, in particular anode conductor portions 26 and 30. Otherwise, this will cause an electronic conduction between the cathode material 136 and the anode conductor sections 26,30 creating an electrical short circuit condition in the cell. In particular, any migration of the iodine-containing complex of material 136 directly to anode conductor sections 26,30, instead of first reacting with a lithium member of the anode, will result in the condition of electronic conduction thereby creating an electrical short circuit condition in the cell. On the other hand, when the iodine-containing material 136 contacts only the lithium portion of the anode this gives rise first to a condition of ionic conduction and results in proper cell operation.

The construction of the cell shown prevents an electrical short circuit resulting from migration or flow of iodine-containing material 136. In particular, anode conductor portion 26 and the neighboring section of conductor portion 30 are sealed within the sandwiched or pressure bonded assembly of lithium elements 22,24. This seal is enhanced by the forming of the peripheral border or margin 88 on the faces of the lithium elements 22,24 during the pressing operation. In particular, forming border 88 during the pressing operation enhances the lithium-lithium bond between elements 22,24. The absence of any strap or frame around the major portion of the periphery of the anode assembly and the termination of ribs 70 in the manner defining border 88 on both faces of lithium elements 22,24 combine to produce an unimpeded and uninterrupted flow of lithium during the anode forming operation. This, in turn, results in greatly increased lithium-to-lithium bonding or cohesion with reduced anode forming pressures as previously discussed in connection with FIGS. 5 and 6.

The improved seal also can be formed alternatively by the border crimping or similar formation, which exposes new lithium surfaces around the inner peripheral faces of the anode assembly, resulting from the alternative method previously discussed in connection with FIGS. 7 and 8.

The foregoing arrangement together with the combination of insulator 32, isolator 42, ferrule 52 and glass seal between ferrule 52 and conductor portion 30 provides an anode structure which is completely sealed with the exception of the exposed lithium surface portions of the anode which are available to the cathode material 136. All parts of the anode conductor portions 26 and 30 extending therefrom are shielded from the cathode material, and from the cell casing. Furthermore, the sealed assembly advantageously is completed before the entire cell is assembled, in particular before cathode material 136 is added thereto. Insulator 32 of Halar or similar material which is non-reactive with iodine surrounds and protects anode lead portion 30 between lid 17 and the lead portion 26 within lithium elements 22,24. Ferrule 52 surrounds and protects lead portion 30 from a point within lid 17 and adjacent insulator portion 36 to a point outside casing 10.

By having all parts of anode conductor portions 26,30 shielded or sealed from cathode material 136 and from the metal casing 10, no insulation is needed between the cathode material and the metal casing. The casing can be completely filled with cathode material which considerably increases the iodine content of the cell as compared to cells requiring insulation. Another advantage of the cell of the present invention is that by virtue of the foregoing arrangement, the metal casing becomes a very large cathode current collector thereby improving cell performance due to the relatively larger amount of cathode material in contact with the current collector. In addition, providing ribs 70 on the operative surfaces of the lithium anode elements 22,24 increases the effective surface area of the anode elements in operative contact with cathode material 136. As previously described, the cathode material not only contacts the oppositely directed anode surfaces of increased area but also contacts a major portion of the peripheral edge and areas immediately adjacent to the edge thereby further increasing the available anode surface area directly in contact with the cathode material. Furthermore, the absence of any strap or frame around a major portion of the anode periphery increases the available volume for additional cathode material, i.e. depolarizer. The absence of the strap or frame also reduces the chance that voids or incomplete fills will form when the depolarizer material is poured into the casing containing the anode assembly. This, in turn, increases the actual ampere-hour rating when it is based upon cathode material volume. The foregoing desirable characteristics are enhanced by the coatings 130,132 of organic electron donor material. By eliminating the need for an anode peripheral strap or frame, previously thought to be necessary to seal both elements of the anode assembly, the cell of the present invention can be assembled more quickly and economically and requires fewer parts. In addition, the improved anode molds and forming device or nest according to the present invention provides effective separation of the anode from the molds and forming device without the use of parting sheets.

It is therefore apparent that the present invention accomplishes its intended objects. While several embodiments of the present invention have been described in detail, this is for the purpose of illustration, not limitation.

I claim:

1. An anode assembly for a lithium-halogen cell including halogen-containing cathode material, said anode assembly comprising an anode electrical conductor sandwiched between a pair of lithium plates defining substantially oppositely-directed lithiumsurfaces terminating in a peripheral edge, at least a major portion of the length of said peripheral edge being uncovered and exposed, at least one of said oppositely-directed lithium surfaces being shaped to include formations which increase the surface area thereof, said formations terminating a short distance inwardly of said peripheral edge thereby defining a marginal bonded border region between said peripheral edge and said formations.

2. An anode assembly according to claim 1, further including co-operating formations on the inner surfaces of said lithium plates near said peripheral edge and shaped to expose new surfaces of lithium plates to each other to enhance the bond therebetween.

3. An anode assembly according to claim 1, wherein the areas of said oppositely-directed lithium surfaces adjacent to said major portion of said peripheral edge also are uncovered and exposed.

4. An anode assembly according to claim 1, wherein said first-named formations are included on both of said oppositely-directed lithium surfaces.

5. An anode assembly according to claim 1, wherein said first-named formations are elongated and are disposed toward said peripheral edge.

6. An anode assembly according to claim 1, further including an element of electrical insulating material covering a minor portion of the length of said peripheral edge.

7. An anode assembly according to claim 1, wherein said anode electrical conductor is of narrow width and contacts only minor portions of the surface area of the inner surfaces of said lithium plates.

* * * * *